United States Patent
Dhuse et al.

(10) Patent No.: US 12,169,652 B2
(45) Date of Patent: *Dec. 17, 2024

(54) OPTIMIZING ACCESS PERFORMANCE IN A DISTRIBUTED STORAGE NETWORK

(71) Applicant: Pure Storage, Inc., Mountain View, CA (US)

(72) Inventors: Greg R. Dhuse, Chicago, IL (US); Jason K. Resch, Warwick, RI (US)

(73) Assignee: Pure Storage, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/819,985

(22) Filed: Aug. 16, 2022

(65) Prior Publication Data

US 2022/0391098 A1 Dec. 8, 2022

Related U.S. Application Data

(63) Continuation of application No. 17/148,781, filed on Jan. 14, 2021, now Pat. No. 11,449,280, which is a
(Continued)

(51) Int. Cl.
*G06F 9/52* (2006.01)
*G06F 3/06* (2006.01)
(Continued)

(52) U.S. Cl.
CPC ............ *G06F 3/067* (2013.01); *G06F 3/0607* (2013.01); *G06F 3/0611* (2013.01);
(Continued)

(58) Field of Classification Search
CPC . G06F 9/526; G06F 3/06; G06F 3/061; G06F 3/0659; G06F 3/067; G06F 11/1076; H04L 67/1097
(Continued)

(56) References Cited

U.S. PATENT DOCUMENTS

| 4,092,732 A | 5/1978 | Ouchi |
| 5,454,101 A | 9/1995 | Mackay |

(Continued)

FOREIGN PATENT DOCUMENTS

| CN | 1666192 A | 9/2005 |
| CN | 100418088 C | 9/2008 |

OTHER PUBLICATIONS

Chung; An Automatic Data Segmentation Method for 3D Measured Data Points; National Taiwan University, pp. 1-8; 1998.
(Continued)

*Primary Examiner* — Idriss N Alrobaye
*Assistant Examiner* — Henry W Yu
(74) *Attorney, Agent, or Firm* — Garlick & Markison; Timothy W. Markison; Kelly H. Hale

(57) ABSTRACT

A method begins by a computing device of a storage network receiving a storage network access request and determining whether the storage network access request requires multiple access steps to a plurality of storage units, where a data segment of the plurality of data segments is dispersed error encoded in accordance with dispersed storage error encoding parameters to produce a set of encoded data slices that are distributedly stored among a plurality of storage units, and where a decode threshold number of encoded data slices are needed to recover the data segment. When the storage network access request requires multiple access steps to a plurality of storage units, the method continues with the computing device determining to delegate at least as portion of the multiple access steps to a delegation agent issuing a multi-step object access partial task to the delegation agent; and receiving a multistep object access result.

20 Claims, 11 Drawing Sheets

Related U.S. Application Data continuation of application No. 16/724,446, filed on Dec. 23, 2019, now abandoned, which is a continuation of application No. 16/284,248, filed on Feb. 25, 2019, now abandoned, which is a continuation of application No. 15/902,083, filed on Feb. 22, 2018, now Pat. No. 10,296,263, which is a continuation-in-part of application No. 14/638,575, filed on Mar. 4, 2015, now Pat. No. 9,965,336.

(60) Provisional application No. 61/986,361, filed on Apr. 30, 2014.

(51) Int. Cl.
| | |
|---|---|
| *G06F 11/10* | (2006.01) |
| *G06F 21/62* | (2013.01) |
| *H04L 41/082* | (2022.01) |
| *H04L 41/50* | (2022.01) |
| *H04L 67/1097* | (2022.01) |

(52) U.S. Cl.
CPC .......... *G06F 3/0619* (2013.01); *G06F 3/0637* (2013.01); *G06F 3/064* (2013.01); *G06F 11/1004* (2013.01); *G06F 11/1076* (2013.01); *G06F 11/1088* (2013.01); *G06F 11/1092* (2013.01); *G06F 21/6218* (2013.01); *H04L 41/082* (2013.01); *H04L 41/5096* (2013.01); *G06F 2221/2107* (2013.01)

(58) Field of Classification Search
USPC ................................ 710/15, 62, 74; 714/6.22
See application file for complete search history.

(56) References Cited

U.S. PATENT DOCUMENTS

| | | | |
|---|---|---|---|
| 5,485,474 | A | 1/1996 | Rabin |
| 5,774,643 | A | 6/1998 | Lubbers |
| 5,802,364 | A | 9/1998 | Senator |
| 5,809,285 | A | 9/1998 | Hilland |
| 5,890,156 | A | 3/1999 | Rekieta |
| 5,987,622 | A | 11/1999 | Lo Verso |
| 5,991,414 | A | 11/1999 | Garay |
| 6,012,159 | A | 1/2000 | Fischer |
| 6,058,454 | A | 5/2000 | Gerlach |
| 6,128,277 | A | 10/2000 | Bruck |
| 6,175,571 | B1 | 1/2001 | Haddock |
| 6,192,472 | B1 | 2/2001 | Garay |
| 6,233,607 | B1* | 5/2001 | Taylor .................. G06F 9/5016 709/215 |
| 6,256,688 | B1 | 7/2001 | Suetaka |
| 6,272,658 | B1 | 8/2001 | Steele |
| 6,301,604 | B1 | 10/2001 | Nojima |
| 6,356,949 | B1 | 3/2002 | Katsandres |
| 6,366,995 | B1 | 4/2002 | Vilkov |
| 6,374,336 | B1 | 4/2002 | Peters |
| 6,415,373 | B1 | 7/2002 | Peters |
| 6,418,539 | B1 | 7/2002 | Walker |
| 6,449,688 | B1 | 9/2002 | Peters |
| 6,567,948 | B2 | 5/2003 | Steele |
| 6,571,282 | B1 | 5/2003 | Bowman-Amuah |
| 6,609,223 | B1 | 8/2003 | Wolfgang |
| 6,718,361 | B1 | 4/2004 | Basani |
| 6,760,808 | B2 | 7/2004 | Peters |
| 6,785,768 | B2 | 8/2004 | Peters |
| 6,785,783 | B2 | 8/2004 | Buckland |
| 6,826,711 | B2 | 11/2004 | Moulton |
| 6,879,596 | B1 | 4/2005 | Dooply |
| 7,003,688 | B1 | 2/2006 | Pittelkow |
| 7,024,451 | B2 | 4/2006 | Jorgenson |
| 7,024,609 | B2 | 4/2006 | Wolfgang |
| 7,080,101 | B1 | 7/2006 | Watson |
| 7,103,824 | B2 | 9/2006 | Halford |
| 7,103,915 | B2 | 9/2006 | Redlich |
| 7,111,115 | B2 | 9/2006 | Peters |
| 7,140,044 | B2 | 11/2006 | Redlich |
| 7,146,644 | B2 | 12/2006 | Redlich |
| 7,171,493 | B2 | 1/2007 | Shu |
| 7,222,133 | B1 | 5/2007 | Raipurkar |
| 7,240,236 | B2 | 7/2007 | Cutts |
| 7,272,613 | B2 | 9/2007 | Sim |
| 7,636,724 | B2 | 12/2009 | de la Torre |
| 8,321,643 | B1 | 11/2012 | Vaghani |
| 8,700,875 | B1 | 4/2014 | Barron |
| 9,367,351 | B1 | 6/2016 | Yang |
| 2002/0062422 | A1 | 5/2002 | Butterworth |
| 2002/0166079 | A1 | 11/2002 | Ulrich |
| 2002/0199129 | A1 | 12/2002 | Bohrer |
| 2003/0018927 | A1 | 1/2003 | Gadir |
| 2003/0037261 | A1 | 2/2003 | Meffert |
| 2003/0065617 | A1 | 4/2003 | Watkins |
| 2003/0084020 | A1 | 5/2003 | Shu |
| 2003/0145186 | A1* | 7/2003 | Szendy ............... G06F 11/3466 711/170 |
| 2004/0024963 | A1 | 2/2004 | Talagala |
| 2004/0122917 | A1 | 6/2004 | Menon |
| 2004/0215998 | A1 | 10/2004 | Buxton |
| 2004/0228493 | A1 | 11/2004 | Ma |
| 2005/0100022 | A1 | 5/2005 | Ramprashad |
| 2005/0114594 | A1 | 5/2005 | Corbett |
| 2005/0125593 | A1 | 6/2005 | Karpoff |
| 2005/0131993 | A1 | 6/2005 | Fatula |
| 2005/0132070 | A1 | 6/2005 | Redlich |
| 2005/0144382 | A1 | 6/2005 | Schmisseur |
| 2005/0229069 | A1 | 10/2005 | Hassner |
| 2006/0047907 | A1 | 3/2006 | Shiga |
| 2006/0136448 | A1 | 6/2006 | Cialini |
| 2006/0156059 | A1 | 7/2006 | Kitamura |
| 2006/0224603 | A1 | 10/2006 | Correll, Jr. |
| 2006/0235838 | A1 | 10/2006 | Shan |
| 2007/0079081 | A1 | 4/2007 | Gladwin |
| 2007/0079082 | A1 | 4/2007 | Gladwin |
| 2007/0079083 | A1* | 4/2007 | Gladwin ............. G06F 21/6227 711/154 |
| 2007/0088970 | A1 | 4/2007 | Buxton |
| 2007/0174192 | A1 | 7/2007 | Gladwin |
| 2007/0214285 | A1 | 9/2007 | Au |
| 2007/0234110 | A1 | 10/2007 | Soran |
| 2007/0283167 | A1 | 12/2007 | Venters |
| 2007/0288783 | A1 | 12/2007 | Ogasawara |
| 2009/0094251 | A1 | 4/2009 | Gladwin |
| 2009/0094318 | A1 | 4/2009 | Gladwin |
| 2010/0023524 | A1 | 1/2010 | Gladwin |
| 2011/0066796 | A1 | 3/2011 | Eilert |
| 2011/0225386 | A1* | 9/2011 | Motwani ............. G06F 11/1076 711/170 |
| 2011/0261838 | A1 | 10/2011 | Baptist et al. |
| 2013/0013958 | A1 | 1/2013 | Leggette |
| 2014/0189082 | A1 | 7/2014 | Fullarton |
| 2015/0088827 | A1 | 3/2015 | Xu |
| 2015/0172120 | A1 | 6/2015 | Dwarampudi |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

(56) References Cited

OTHER PUBLICATIONS

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

State Intellectual Property Office; Office Action; CN App. No. 201580021723.2; May 2, 2008; 14 pgs.

Weil, Sage. Reliable, Scalable, and High,-Performance Distributed Storage: Data Distribution. Feb. 19, 2014. Found at <https://ip.com/IPCOM/000234958> (Year: 2014).

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

\* cited by examiner

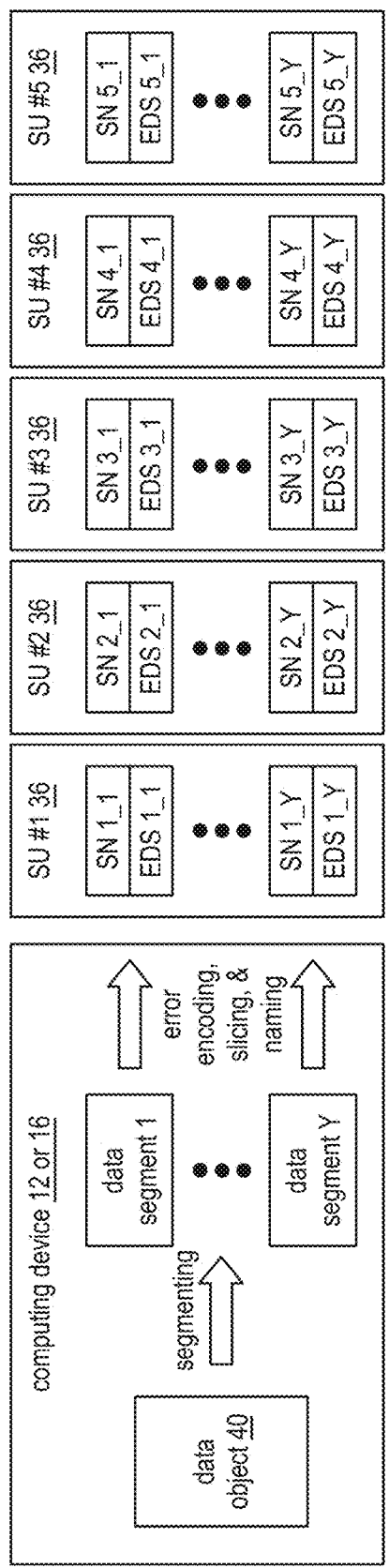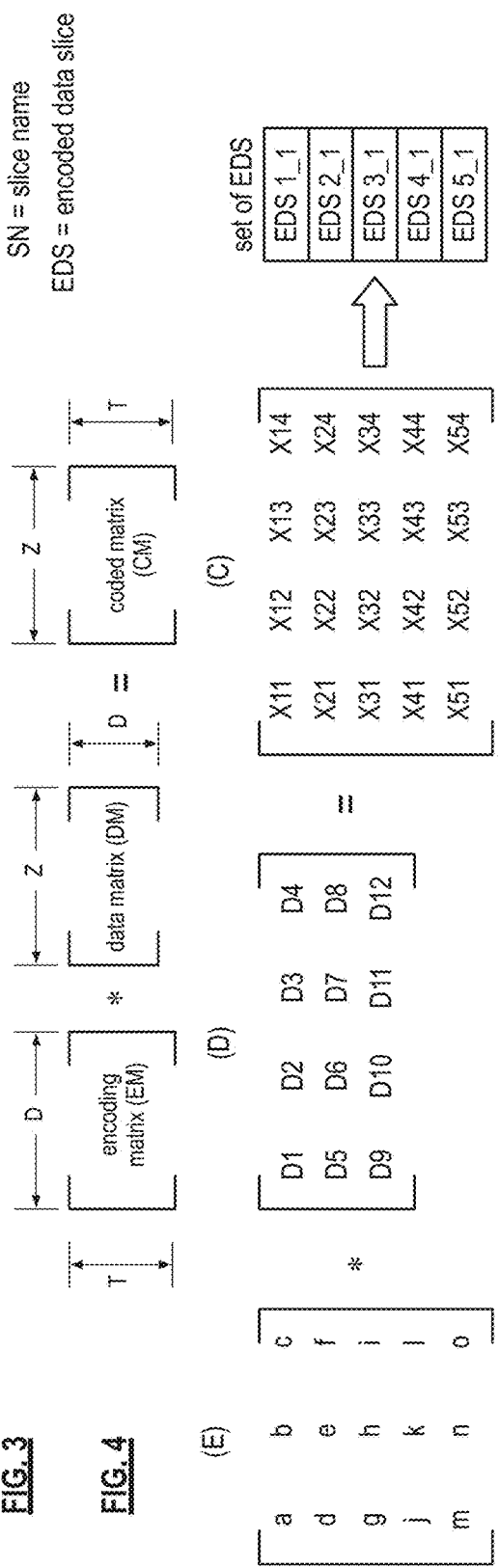

OPTIMIZING ACCESS PERFORMANCE IN A DISTRIBUTED STORAGE NETWORK

CROSS REFERENCE TO RELATED PATENTS

The present U.S. Utility patent application claims priority pursuant to 35 U.S.C. § 120 as a continuation of U.S. Utility application Ser. No. 17/148,781, entitled "DYNAMIC PROVISIONING AND ACTIVATION OF STORAGE POOLS", filed Jan. 14, 2021, which is a continuation of U.S. Utility application Ser. No. 16/724,446, entitled "BUCKET UPDATE IN DATA STORE OPERATION," filed Dec. 23, 2019, which claims priority pursuant to 35 U.S.C. § 120 as a continuation of U.S. Utility application Ser. No. 16/284,248, entitled "DISPERSED BLOOM FILTER FOR DETERMINING PRESENCE OF AN OBJECT," filed Feb. 25, 2019, which claims priority pursuant to 35 U.S.C. § 120 as a continuation of U.S. Utility application Ser. No. 15/902,083, entitled "DISPERSED BLOOM FILTER FOR DETERMINING PRESENCE OF AN OBJECT," filed Feb. 22, 2018, issued as U.S. Pat. No. 10,296,263 on May 21, 2019, which claims priority pursuant to 35 U.S.C. § 120, as a continuation-in-part (CIP) of U.S. Utility patent application Ser. No. 14/638,575, entitled "DELEGATING ITERATIVE STORAGE UNIT ACCESS IN A DISPERSED STORAGE NETWORK," filed Mar. 4, 2015, issued as U.S. Pat. No. 9,965,336 on May 8, 2018, which claims priority pursuant to 35 U.S.C. § 119(e) to U.S. Provisional Application No. 61/986,361, entitled "ACCESSING METADATA IN A DISPERSED STORAGE NETWORK," filed Apr. 30, 2014, all of which are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Prior art data storage systems do not provide an effective and efficient means by which determination may be made regarding storage (or non-storage) of data therein. There exists room in the art for improved means by which such determination may be made within data storage systems.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
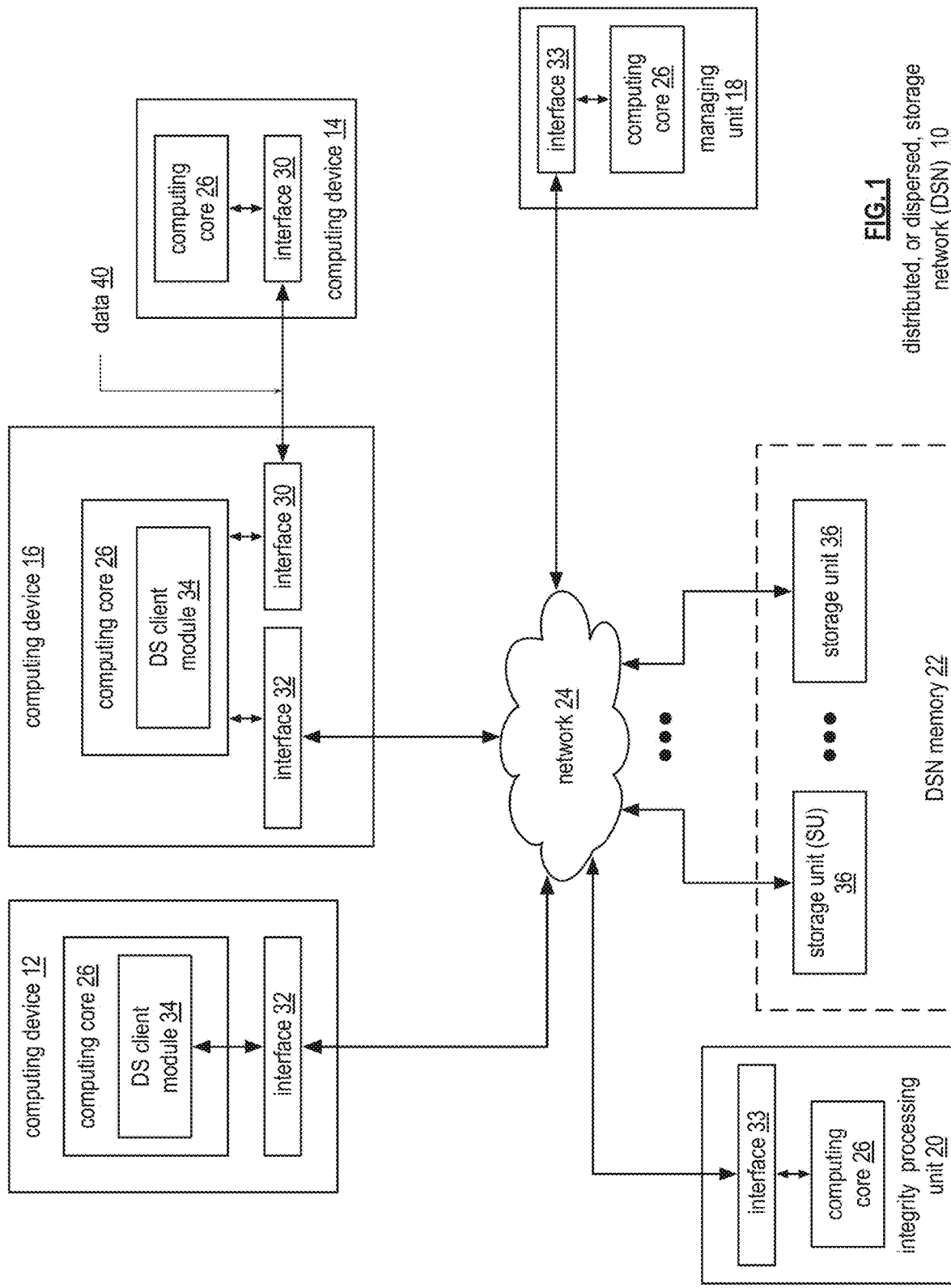
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
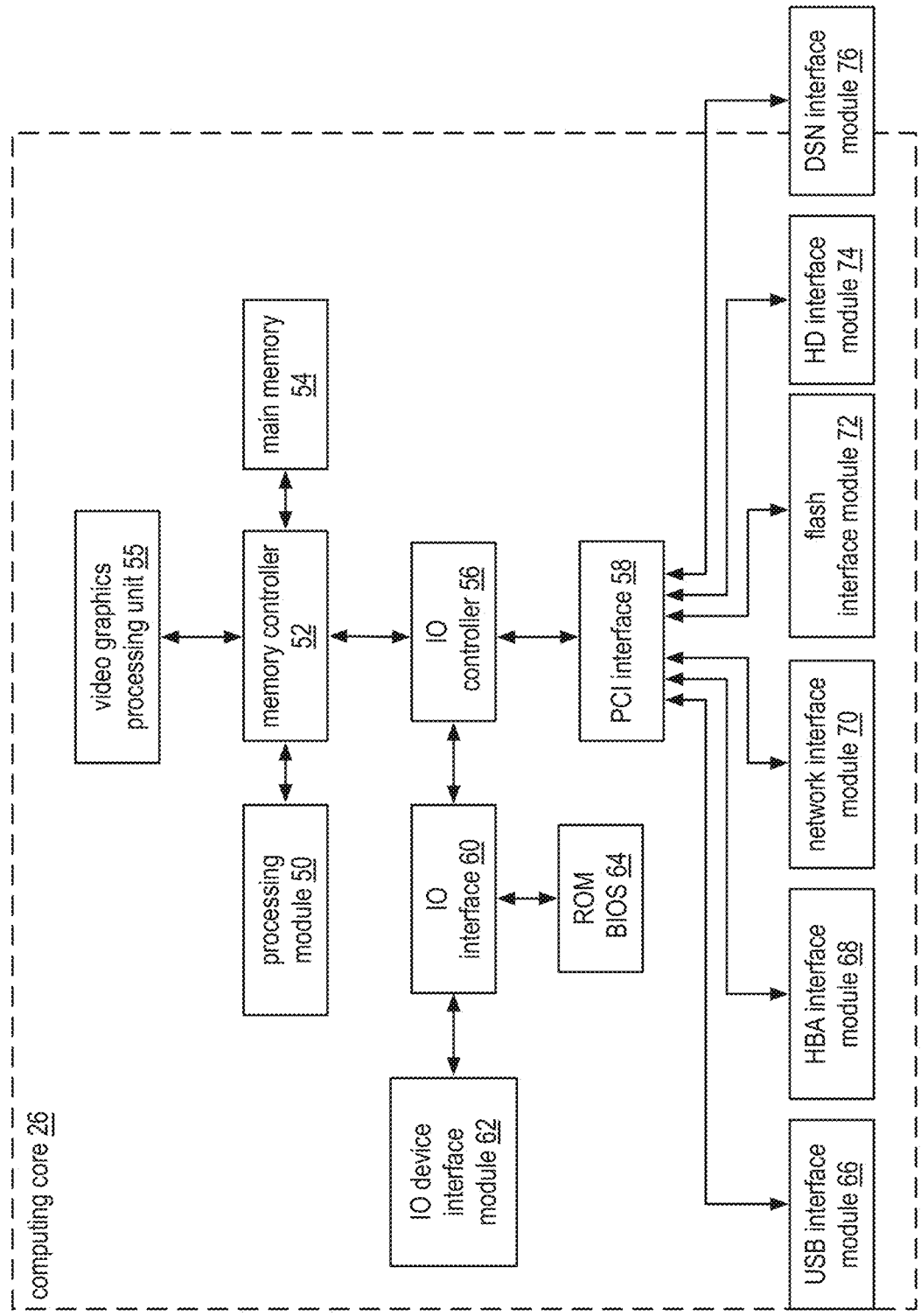
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
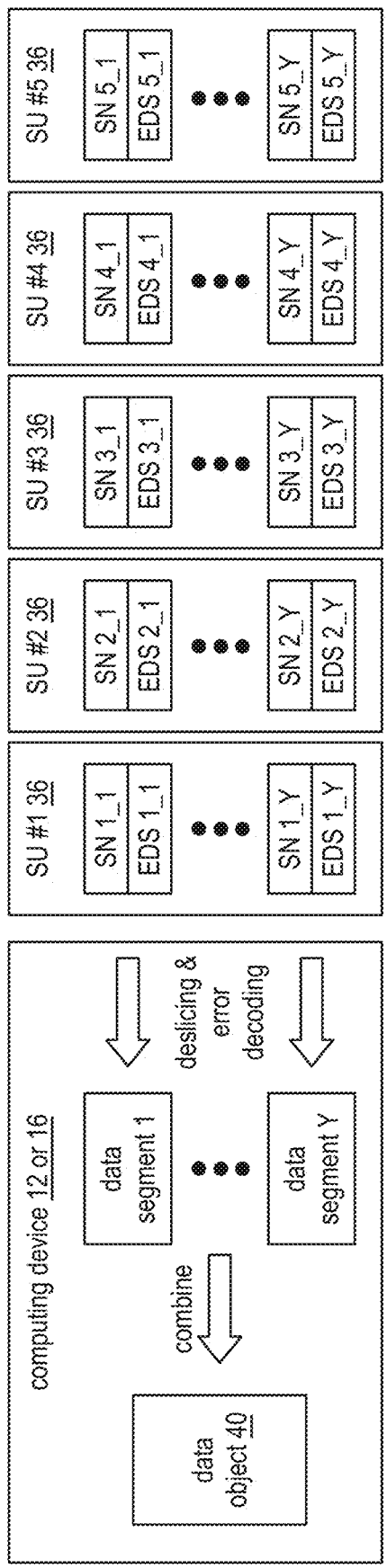
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In some examples, note that dispersed or distributed storage network (DSN) memory includes one or more of a plurality of storage units (SUs) such as SUs 36 (e.g., that may alternatively be referred to a distributed storage and/or task network (DSTN) module that includes a plurality of distributed storage and/or task (DST) execution units 36 that may be located at geographically different sites (e.g., one in Chicago, one in Milwaukee, etc.). Each of the SUs (e.g., alternatively referred to as DST execution units in some examples) is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

In addition, a computing device (e.g., alternatively referred to as DST processing unit in some examples) is operable to perform various functions, operations, etc. including to generate dispersed error encoded data. In some examples, a computing device is configured to process a data object to generate a plurality of data segments (such that the data object is segmented into a plurality of data segments). Then, the computing device is configured to dispersed error encode the plurality of data segments in accordance with dispersed error encoding parameters to produce sets of encoded data slices (EDSs). In some examples, the computing device is configured to dispersed error encode a data segment of the plurality of data segments in accordance with the dispersed error encoding parameters to produce a set of EDSs. In certain examples, the set of EDSs is distributedly stored in a set of storage units (SUs) within the DSN.

Figure 9A:
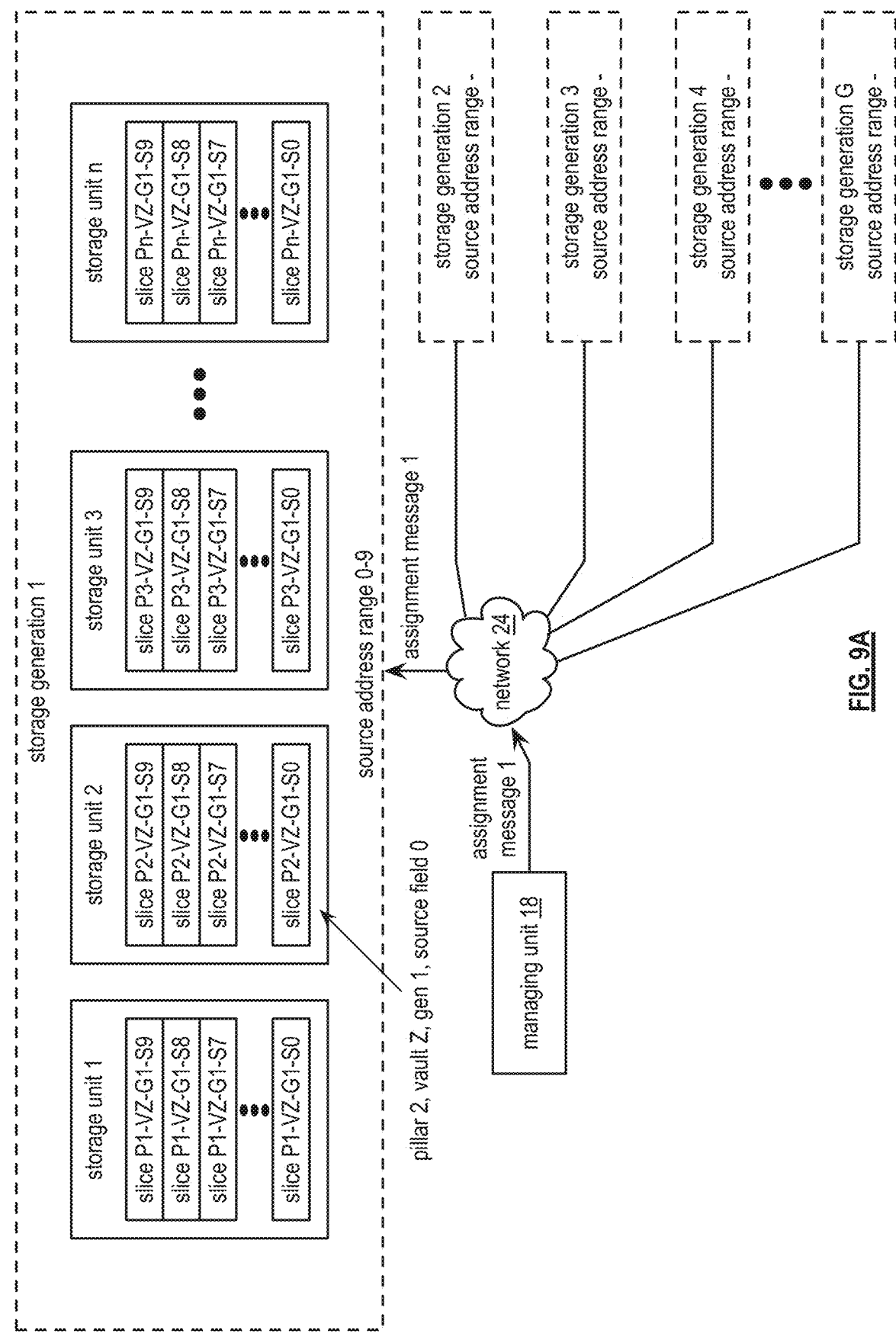
FIG. 9A is a schematic block diagram of another embodiment of a dispersed storage network (DSN) in accordance with the present invention.

FIG. 9A is a schematic block diagram of another embodiment of a distributed or dispersed storage network (DSN) that includes a plurality of storage generations 1-G, the managing unit 18 of FIG. 1, and the network 24 of FIG. 1. Each storage generation includes a set of storage units 1-n. Each storage unit may be implemented utilizing the storage unit 36 of FIG. 1.

The DSN functions to store data as sets of encoded data slices associated with a source address range. The source address range includes a portion of slice names associated with the sets of encoded data slices. Each storage generation is associated with two states of readiness of operation. The two states includes active and inactive. The storage generation is available to store and retrieve sets of encoded data slices when the storage generation is active. The storage generation is not available to store and retrieve sets of encoded data slices when the storage generation is inactive (e.g., dormant and not yet assigned). For example, at a time t0, storage generation 1 is active and storage generations 2-G are inactive.

When a storage generation is active, the storage generations associated with a portion of a source address range. The source address range includes a portion of a range of slice names such that the DSN accesses encoded data slices associated with the range of slice names by utilizing the associated storage generation. The slice name includes a pillar index (e.g., 1-n for an information dispersal algorithm (IDA) width of 1), a vault identifier, a generation identifier, and a source field. The source field may include an object number associated with a data object for storage and a segment number based on divisions of the data object are required to produce a plurality of data segments. For example, the storage generation 1, at time t0, is associated with an entire source address range of 0-9 such that all encoded data slices associated with the source address range 0-9 are accessed utilizing the storage generation 1. While a first-generation of data is being stored for a vault Z, the DST execution unit 1 of the storage generation 1 is associated with encoded data slices with slice names ranging from P1-VZ-G1-S0 through P1-VZ-G1-S9, the DST execution unit 2 of the storage generation 1 is associated with encoded data slices with slice names ranging from P2-VZ-G1-S0 through P2-VZ-G1-S9, etc.

In an example of operation, the managing unit 18 determines to establish a first storage generation. The determining may be based on one or more of receiving a manager input, interpreting a schedule, receiving and activation request, interpreting configuration information, detecting that a new set of storage units is available, and detecting that additional storage capacity is required (e.g., another storage generation utilization level compares unfavorably to a maximum storage generation utilization threshold level).

When determining to establish the first storage generation, the managing unit 18 assigns storage parameters for at least one vault to be associated with the storage generation. The storage parameters includes one or more of a vault ID, and IDA type, and IDA width, a write threshold number, a read threshold number, a rebuilding threshold number, and a decode threshold number. The assigning includes one or more of receiving a manager input, interpreting a system registry, estimating DSN performance, and interpreting a DSN performance goal level. For example, the DSTN managing unit 18 establishes the storage parameters to include a vault ID of Z based on a manager input.

Having assigned the storage parameters, the managing unit 18 determines a generation number and a source address range to generation map for the storage generation. For example, the managing unit 18 determines generation 1 when establishing a first storage generation. As another example, the managing unit 18 determines a source address range of 0-9 mapped to the storage generation 1 based on a manager input.

Having determined the generation number and the source address range to generation map, the managing unit 18 issues and assignment message to a set of storage units associated with the storage generation, where the message includes one or more of the generation number, source address range, identifiers of the storage units, and a portion of the assigned a storage parameters. For example, the managing unit 18 sends, via the network 24, an assignment message 1 to the set of storage units 1-n of the storage generation 1 to associate the set of storage units with the source address range of 0-9, for generation 1 for vault Z. The method to add a new storage generation is discussed in greater detail with reference to FIG. 9B.

Figure 9B:
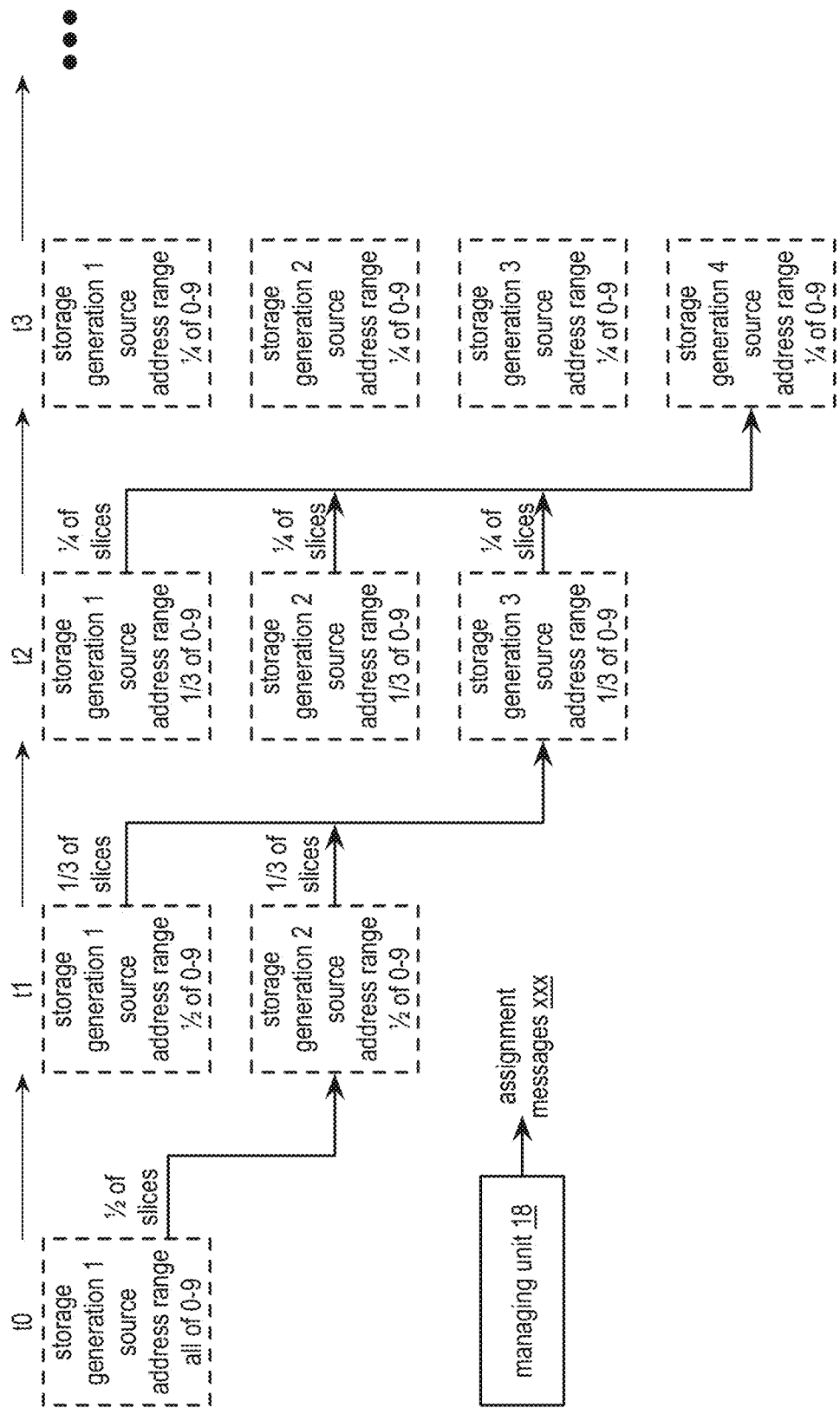
FIG. 9B is a schematic block diagram of a plurality of storage generations in accordance with the present invention.

FIG. 9B is a schematic block diagram of a plurality of storage generations 1-4 activated over times t0-t3 by the managing unit 18 of FIG. 9A in accordance with a storage generation activation scheme. In an example of operation of the activation of the storage generations, the managing unit 18 determines, to add another storage generation to one or more current storage generations. The determining may be based on one or more of detecting an unfavorable storage utilization level, detecting an unfavorable level of input/output operations, detecting an unfavorable number of meta-data objects stored in the one or more current storage generations, receiving a manager input, interpreting a schedule, receiving an activation request, interpreting configuration information, detecting that a new set of storage units is available, and detecting that additional storage capacity is required.

Having determined to add another storage generation, the managing unit 18 obtains the source address range to generation map. The obtaining includes at least one of retrieving from a storage unit, retrieving from a local memory, and extracting from a system registry. Having obtained the source address range to generation map, the managing unit 18 determines a number of generations when adding a generation to the one or more current storage generations. The determining may be based on one or more of interpreting a level of unfavorable storage utilization, interpreting a level of unfavorable input/output operations, and interpreting a level of number of metadata objects stored in the one or more current generations. For example, the DSTN managing unit 18 determines to add one new storage generation when the level of unfavorable storage utilization is greater than a maximum threshold level and less than a critical threshold level.

Having determined the number of generations, the managing unit 18 updates the source address range to generation map based on the number of generations and a deterministic address reallocation scheme, where each storage generation is assigned an equal portion of the source address range in accordance with the number of generations and where, for each current generation, a portion of a current assignment of the source address range is reassigned to the other storage generation. For example, at time t1, the managing unit 18 updates the source address range to generation map such that one half of the source address range remains with the storage generation 1 and another half of the source address range is now assigned to a new storage generation 2. As another example, at time t2, the managing unit updates the source address range to generation map such that each of storage generation 1, 2 and new storage generation 3 is associated with one third of the source address range. As yet another example, at time t3, each storage generation is associated with one fourth of the source address range.

Having updated the source address range to generation map, the managing unit 18 facilitates distribution of the updated source address range to generation map each of the other generations and the one or more current generations. For example, the managing unit 18 issues assignment messages to the storage generations, where the assignment messages includes the updated source address range of generation map.

Having distributed the updated source address range to generation map, the managing unit 18 facilitates migration of encoded data slices from each of the one or more current storage generations to a the other storage generations in accordance with the updated source address range to generation map. The facilitation includes at least one of retrieving and starring slices, sending a request to each other storage generation to issue a read slice requests, and issuing a request to each of the one or more current storage generations to issue a write slice requests. For example, at time t1, one half of the slice is stored in the storage generation 1 are migrated to storage generation 2. As another example, at time t2, one third of the slices stored in the storage generation 1 are migrated to the storage generation 3 and one third of the slices stored in the storage generation 2 are migrated to the storage generation 3. As yet another example, at time t3, one fourth of the slices stored in the storage generation 1 are migrated to the storage generation 4, one fourth of the slices stored in the storage generation 2 are migrated to the storage generation 4, and one fourth of the slices stored in the storage generation 3 are migrated to the storage generation 4.

Figure 9C:
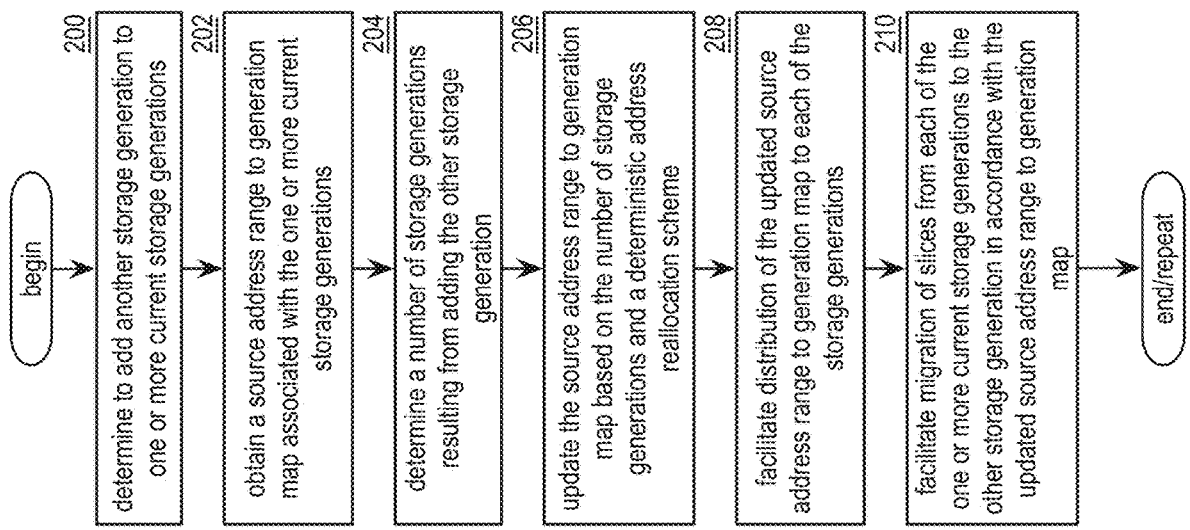
FIG. 9C is a flowchart illustrating an example of adding a storage generation to a dispersed storage network (DSN) in accordance with the present invention.

FIG. 9C is a flowchart illustrating an example of adding a storage generation to a dispersed storage network (DSN). The method begins at step 200 where a processing module (e.g., of a managing unit 18) determines to add another storage generation to one or more current storage generations. The determining may be based on one or more of detecting an unfavorable storage utilization level, detecting an unfavorable level of input/output operations, and detecting an unfavorable number of meta-data objects stored in the one or more current generations.

The method continues at step 202 where the processing module obtains a source address range to generation map associated with the one or more current storage generations. The obtaining includes at least one of retrieving from a storage generation, extracting from a system registry, initiating a query, and receiving a query response.

The method continues at step 204 where the processing module determines a number of storage generations resulting from adding the other storage generation. For example, the processing module adds a number of current generations from the source address range to generation map and a number of new generations to produce a number of generations N.

The method continues at step 206 where the processing module updates the source address range to generation map based on the number of storage generations and a deterministic address reallocation scheme. For example, the processing module applies the deterministic address reallocation scheme to the address range to provide equal sized address ranges. For instance, the total range is divided by N to produce the portion for each generation such that equal sized portions of the previous address range assignments are assigned to the new generation (e.g., 1/N from each). The address reallocation scheme may further include utilizing contiguous address ranges one possible.

The method continues at step 208 where the processing module facilitates distribution of the updated source address range to generation map to each of the storage generations. For example, the processing module publishes the map to all generations and adds the map to system registry information for future publishing. The method continues at step 210 where the processing module facilitates migration of slices from each of the one or more current storage generations to the other storage generation in accordance with the updated source address range to generation map. For example, the processing module sends migration requests to the one or more current generations. As another example, the processing module sends a migration request to the other storage generation where the migration message includes instructions to issue a read slice requests to the one or more current storage generations for address ranges of the slices for migration.

Figure 10A:
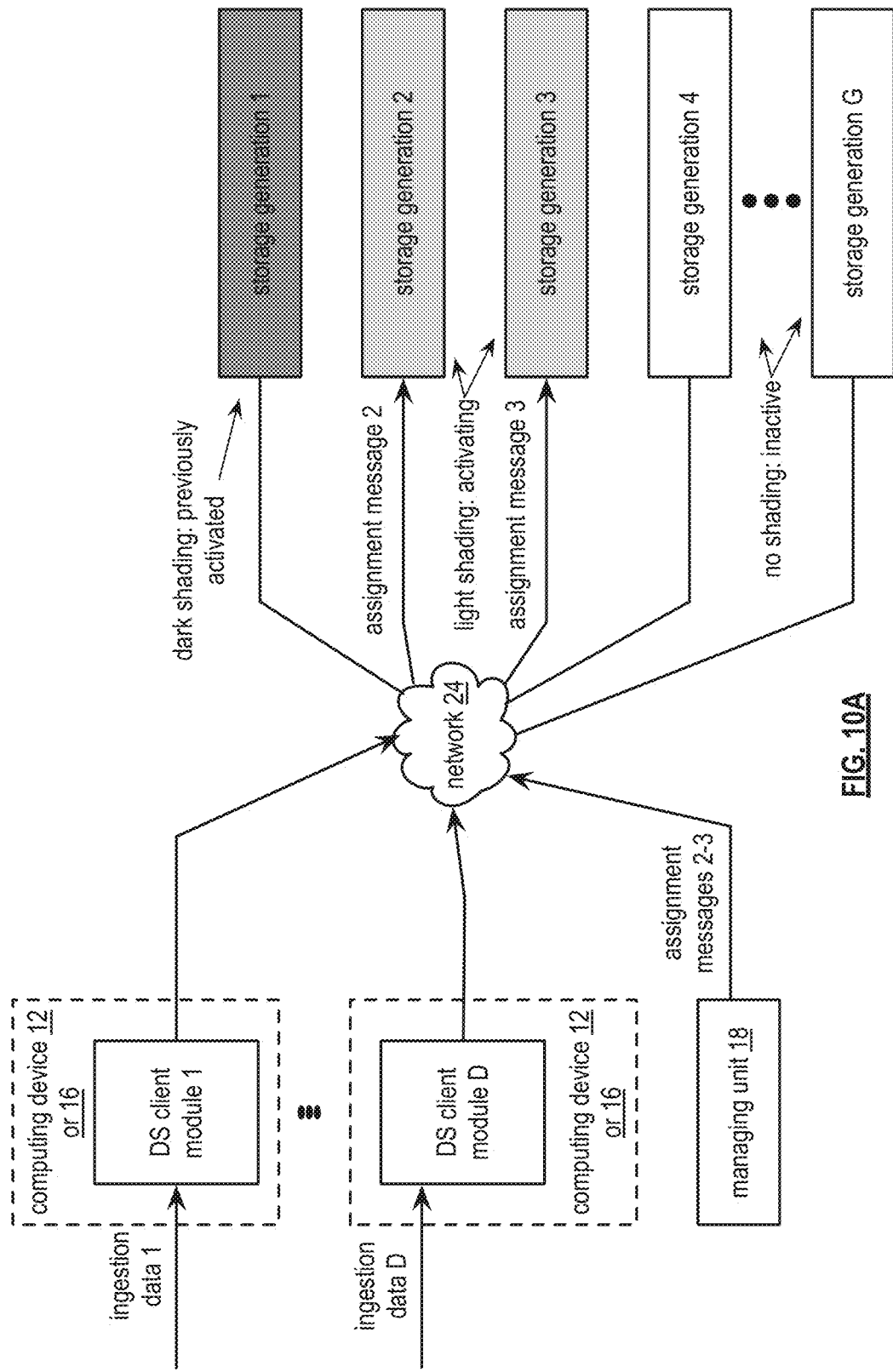
FIG. 10A is a schematic block diagram of another embodiment of a dispersed storage network (DSN) in accordance with the present invention.

FIG. 10A is a schematic block diagram of another embodiment of a distributed or dispersed storage network (DSN) that includes a plurality of computing devices 12 or 16 with client modules 1-D, the managing unit 18 of FIG. 1, the network 24 of FIG. 1, and the plurality of storage generations 1-G. The DSN functions to ingest large amounts of data storage in one or more of the storage generations and to activate storage generations in accordance with the ingesting of the data. For example, client module 1 receives ingesting data 1, dispersed storage error encodes the digestion data sets of encoded data slices, and stores the sets of encoded data slices in previously activated storage generation 1.

In an example of operation, managing unit 18 obtains a storage utilization level for each currently active storage generation. The obtaining includes at least one of issuing a storage utilization level request, receiving a storage utilization level response, interpreting an error message, interpreting a DSN log, interpreting storage indicators within a dispersed hierarchical index, and performing a lookup.

Having obtained the storage utilization level, the managing unit 18 can obtain a data ingestion rate for each of the currently active storage generations. The obtaining includes at least one of issuing a data ingestion rate request, receiving a data ingestion rate response, interpreting the DSN log, interpreting storage indicators within a dispersed hierarchical index, performing a lookup, issuing a query to one or more client modules, receiving a query response from at least one client module, and performing a lookup.

Having obtained the data ingestion rate, the managing unit 18 determines whether to activate one or more other storage generations based on the storage utilization level and the data ingestion rate. For example, the managing unit 18 indicates to activate an additional storage generation when the storage utilization level is greater than a maximum storage utilization threshold level. As another example, the managing unit 18 indicates to activate the additional storage generation when the data ingestion rate is greater than a maximum data ingestion threshold level.

When activating the one or more other storage generations, the managing unit 18 determines a number of storage generations to activate based on one or more of the storage utilization level, the data ingestion rate, and the maximum data ingestion threshold level. For example, the managing unit 18 determines to activate two or more generations when the data ingestion rate is greater than the maximum data ingestion threshold level. As another example, the managing unit 18 estimates a number of required generations such that a maximum data ingestion rate threshold level is not compromised for any storage generations.

Having determined the number of storage generations to activate, the managing unit 18 issues assignment messages to inactive storage generations in accordance with the number of storage generations to activate, where the assignment messages includes one or more of an indication to activate, an assigned DSN address range, and an amount of storage capacity to allocate for storage. For example, the managing unit 18 issues, via the network 24, assignment messages 2-3 to storage generations 2-3 to initiate activation.

Figure 10B:
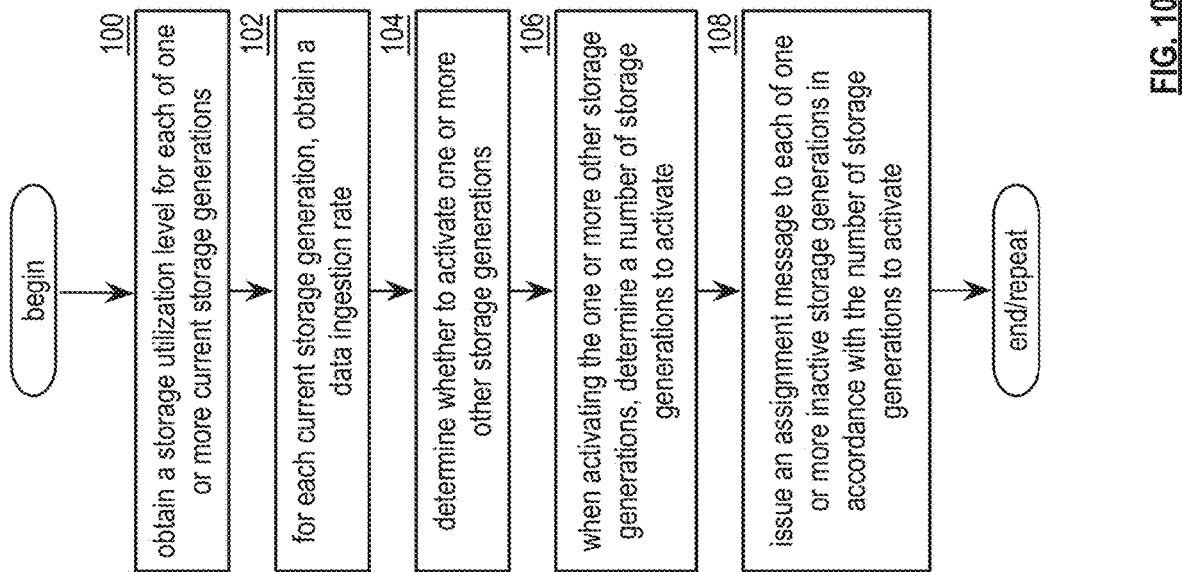
FIG. 10B is a flowchart illustrating an example of activating a storage generation in accordance with the present invention.

FIG. 10B is a flowchart illustrating an example of activating a storage generation. The method begins at step 100 where a processing module (e.g., computing devices 12 or 16 or a managing unit) obtains a storage utilization level for each of one or more current storage generations. The obtaining includes at least one of initiating a query, receiving a query response, performing a lookup, and interpreting system activity logs. For each current storage generation, the method continues at step 102 where the processing module obtains a data ingestion rate. The obtaining includes at least one of initiating a query, receiving a query response, performing a lookup, and interpreting system activity logs.

The method continues at step 104 where the processing module determines whether to activate one or more other storage generations. For example, the processing module indicates to activate when at least one of the storage utilization level is greater than a maximum storage utilization threshold level and/or when the data ingestion rate is greater than a maximum data ingestion threshold level.

When activating the one or more other storage generations, the method continues at step 106 where the processing module determines a number of storage generations to activate. For example, the processing module estimates a number of required generations such that the data ingestion rate for each of the one or more current storage generations in each of the one or more other storage generations is less than a low data ingestion threshold level.

The method continues at step 108 where the processing module issues an assignment message to each of one or more inactive storage generations in accordance with the number of storage generations to activate. For example, the processing module generates the assignment message to include an assigned DSN address range and amount of storage capacity to allocate and sends the assignment message to storage units of the one or more other storage generations.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

Figure 11A:
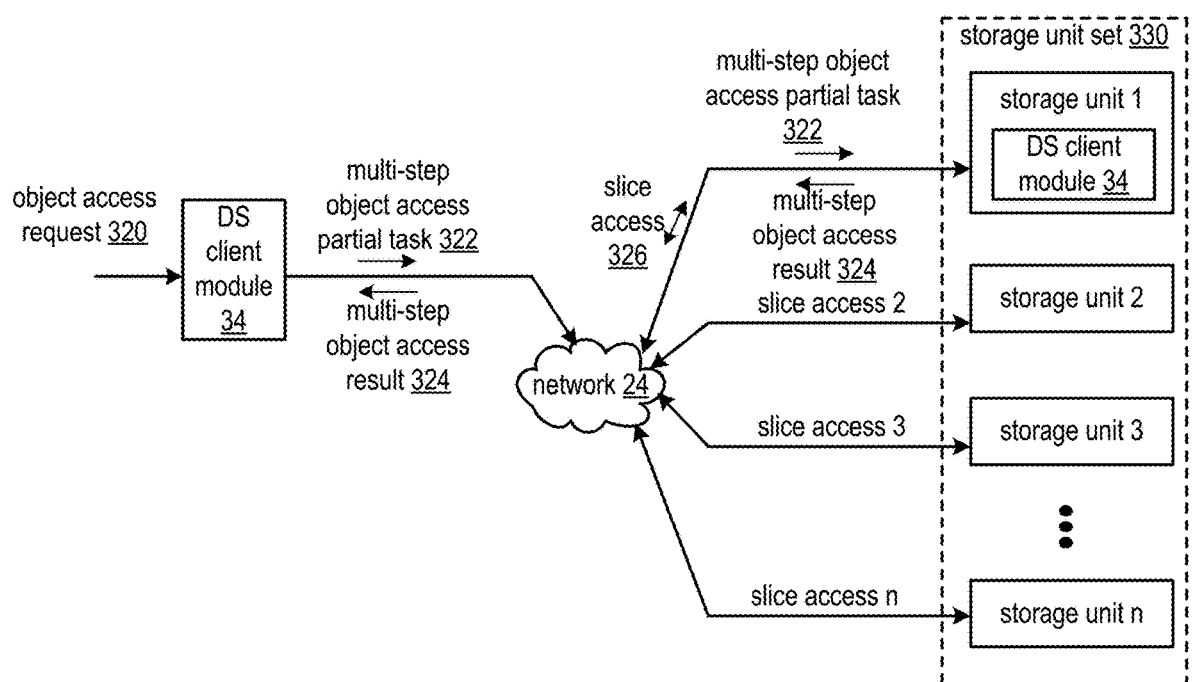
FIG. 11A is a schematic block diagram of another embodiment of a dispersed storage network (DSN) in accordance with the present invention.

FIG. 11A is a schematic block diagram of another embodiment of a dispersed storage network (DSN) that includes the distributed storage (DS) client modules 34 of FIG. 1, the network 24 of FIG. 1, and a storage unit set 330. The storage unit set includes a set of storage units 1-n. Each storage unit may be implemented utilizing the storage unit 36 of FIG. 1. At least one storage unit includes the DS client module 34 of FIG. 1.

The DSN functions to provide access to data stored in the storage unit set 330 to DS client module 34. In an example of operation of providing the access, the DS client module 34 receives a data object access request 320 for a data object stored in the storage unit set 330 as a plurality of sets of encoded data slices. The object access request includes one or more of a search term associated with the data object, a root index node address, a dispersed hierarchical index identifier, a data identifier, a data object for storage, and a leaf node address corresponding to the data object.

Having received the object access request 320, the DS client module 34 determines that the object access request requires multiple access steps with the set of storage units 330. As a specific example, the DS client module 34 determines that the object access request requires the multiple access steps when determining that access to the data object requires previous access to one or more other objects stored in the storage unit set 330. For instance, the DS client module 34 indicates that the object access request 320 requires the multiple access steps when receiving the search term to access a dispersed hierarchical index which requires the previous access to one or more other objects (e.g., nodes of the index).

Having determined that the object access request 320 requires the multiple access steps, the DS client module 34 determines whether to directly access the storage unit set 330 or to delegate the multiple access steps. The determining may be based on one or more of an estimated performance level of each of the directly accessing the storage unit set and the delegating of the multiple access steps, a comparison of the two estimates, and a comparison of each estimate to desired performance threshold levels. For example, the DS client module 34 determines to delegate the multiple access steps when a difference between the estimated performance level of the delegating of the multiple access steps and the estimated performance level of the direct access to the storage unit set is greater than a difference threshold level.

When delegating, the DS client module 34 selects a delegation agent associated with the set of storage units 330. The delegation agent may be implemented utilizing one or more of a processing module, another DS client module 34 and/or another DS client module 34 associated with a DS processing unit 16 of FIG. 1. For example, the DS client module 34 identifies candidate delegation agents and selects a candidate agent associated with a favorable estimated performance level of delegating to produce the selected delegation agent. The identifying of the candidate agents includes at least one of interpreting a list, issuing a query to entities of the DSN, and identifying the storage units of the storage unit set. For instance, the DS client module 34 selects a DS client module 34 of storage unit 1 when the DS client module 34 of the storage unit 1 is associated with the favorable estimated performance level of the delegating.

Having selected the delegation agent, the DS client module 34 issues, via the network 24, a multi-step object access partial task 322 to the selected delegation agent. The issuing includes generating the multi-step object access partial task to include one or more of a portion of the object access request, an identifier of the DS client module 34, and identity of the set of storage units.

The DS client module 34 of the storage unit 1 processes the multi-step object access partial task 322 to produce a multi-step object access result. As a specific example, the DS client module 34 of the storage unit 1 issues, via the network 24, one or more sets of slice access requests 1-n to the set of storage units, receives slice access responses, interprets the slice access responses to generate one or more of further slice access requests and a desired result. For instance, the DS client module 34 of the storage unit 1 searches the dispersed hierarchical index by a series of access requests and responses to extract a DSN address of a desired data object from a corresponding leaf node of the dispersed hierarchical index.

Having produced the multi-step object access result, the storage unit 1 sends, via the network 24, the multi-step object access result 324 to the DS client module 34. The DS client module 34 receives the multi-step object access result 324 and processes the result (e.g., further accessing the storage unit set using the DSN address of the desired data object extracted from the multi-step object access result).

Figure 11B:
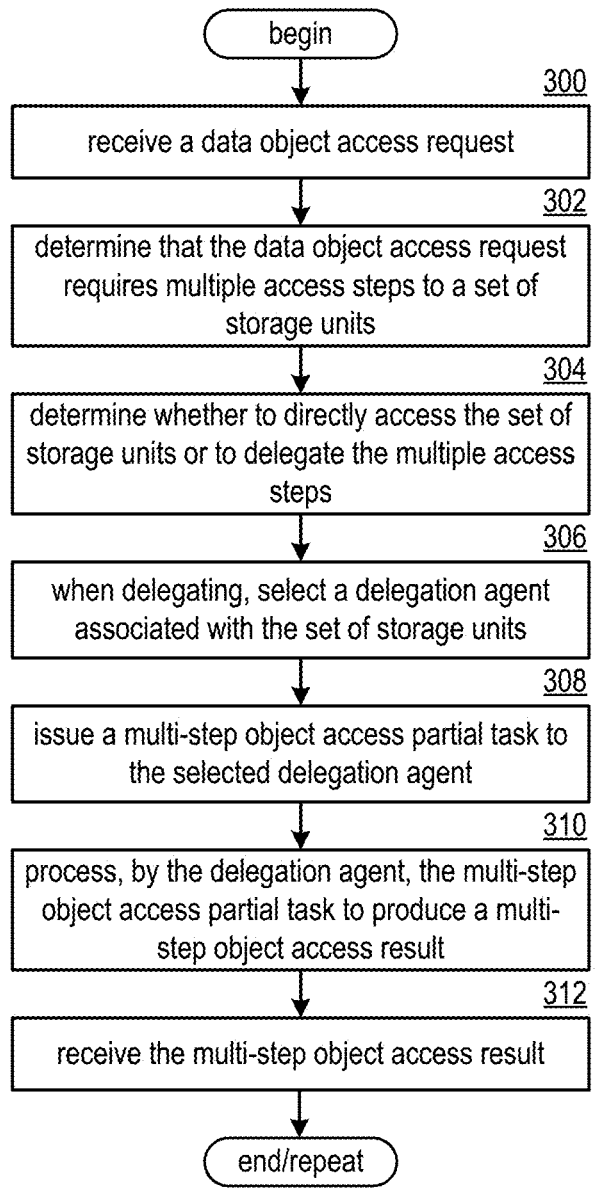
FIG. 11B is a flowchart illustrating an example of optimizing access to a set of storage units in accordance with the present invention.

FIG. 11B is a flowchart illustrating an example of optimizing access to a set of storage units. The method begins at step 300 where a processing module (e.g., of a distributed storage (DS) client module 34) receives a data object access request. The method continues at step 302 where the processing module determines that the data object access request requires multiple access steps to set of storage units. For example, the processing module identifies a nature of the request and indicates the multiple access step requirement when the nature of the request involves multiple steps. For instance, the processing module identifies a nature of the request as a search of a dispersed hierarchical index to identify a dispersed storage network (DSN) address of a desired data object for retrieval.

The method continues at step 304 with the processing module determining whether to directly access the set of storage units to delegate the multiple access steps. For example, the processing module indicates to directly access the set of storage units when directly accessing the set of storage units is associated with a higher level of performance as compared to delegating the multiple access steps. As another example, the processing module indicates to delegate the multiple access steps when the delegating of the multiple access steps is associated with a higher level of performance as compared to directly accessing the set of storage units.

When delegating, the method continues at step 306 where the processing module selects a delegation agent associated with the set of storage units. The selecting includes identifying candidate delegation agents and identifying a candidate delegation agent associated with an estimated favorable performance level of execution of the multiple access steps. For example, the processing module selects a first storage unit of the set of storage units when the first storage unit is associated with the estimated favorable performance level of execution of the multiple access steps.

The method continues at the step 308 where the processing module issues a multi-step object access partial task to the selected delegation agent. The issuing includes generating the partial task to include a portion of the data object access request and identity of the set of storage units. The method continues at step 310 where the delegation agent processes the multi-step object access partial task to produce a multi-step object access result. For example, the delegation agent issues slice access requests to the set of storage units, receives slice access responses, and generates the multi-step object access result. For instance, the delegation agent searches the dispersed hierarchical index and generates the multi-step object access result to include the DSN address of the desired data object. Having generated the multi-step object access result, the delegation agent sends the multi-step object access result to the processing module.

The method continues at the step 312 where the processing module receives the multi-step object access result. The receiving may further include for the processing of a portion of the multi-step object access result to satisfy the data object access request. For example, the processing module initiates recovery of the desired data object utilizing the DSN address of the desire data object.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/ or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of one or more computing devices of a storage network, the method comprises:
   receiving a storage network access request pertaining to a data object, wherein the data object is segmented into a plurality of data segments, wherein a data segment of the plurality of data segments is dispersed error encoded in accordance with dispersed storage error encoding parameters to produce a set of encoded data slices, wherein the set of encoded data slices are distributedly stored among a plurality of storage units, and wherein a decode threshold number of encoded data slices are needed to recover the data segment;
   determining whether the storage network access request requires multiple access steps to at least some storage units of the plurality of storage units;
   in response to a determination that multiple access steps are required, delegating at least a portion of the multiple access steps to a delegation agent, wherein the delegation agent is associated with a storage unit of the plurality of storage units;
   and
   receiving a multistep object access result.

2. The method of claim 1, wherein the delegation agent is coupled via a local area network (LAN) connection to one or more other storage units of the plurality of storage units.

3. The method of claim 2, wherein the LAN connection to the delegation agent provides relatively lower latency for communications than a wide area network connection to one or more other storage units of the plurality of storage units.

4. The method of claim 2, wherein the delegation agent includes an iterative storage unit access process associated with the storage unit.

5. The method of claim 1, wherein the delegating the multiple access steps to a delegation agent further comprises:
   determining that the delegation agent can execute the at least a portion of the multiple access steps better than the one or more processing modules.

6. The method of claim 1, wherein the storage unit of the plurality of storage units includes a storage unit processor, wherein the delegation agent comprises one or more storage unit processing modules of the storage unit processor.

7. The method of claim 1, wherein the storage network access request comprises:
   a request for addressing information regarding data having one or more search criteria, wherein an iterative storage unit access process is executed to traverse an index tree to identify the data based on the one or more search criteria; and
   a request for the data having the one or more search criteria.

8. The method of claim 1, wherein a decode threshold number of the set of storage units is required to execute the storage network access request, wherein at least a decode threshold number of storage units is coupled via a wide area network connection to the delegation agent.

9. The method of claim 1, wherein the determining to delegate at least as portion of the multiple access steps to a delegation agent associated further comprises:
   determining that the delegation agent can execute at least a portion of the multiple access steps better than the one or more processing modules when the delegation agent is coupled to a read threshold number of storage units of the plurality of storage units via a local area network connection.

10. The method of claim 1 further comprises:
    for each step of the multiple access steps:
      receiving a group partial response from the delegation agent that represents a collective response of a first sub-set of the plurality of storage units;
      receiving iterative partial responses from a second sub-set of the plurality of storage units; and
      processing a group partial response and the iterative partial responses to produce an iterative response.

11. A non-transitory computer readable storage medium comprises:
    at least one memory section that stores operational instructions that, when executed by one or more processing modules of a computing device of a storage network, causes the computing device to:
      determine whether a storage network access request requires multiple access steps to a sub-set of storage units of a plurality of storage units;
      in response to a determination that multiple access steps are required, delegate at least a portion of the multiple access steps to a delegation agent, wherein the delegation agent is associated with a storage unit of the plurality of storage units;
      and
      receive a multistep object access result.

12. The non-transitory computer readable storage medium of claim 11, wherein the delegation agent is coupled via a local area network (LAN) connection to one or more other storage units of the plurality of storage units.

13. The non-transitory computer readable storage medium of claim 12, wherein the LAN connection to the delegation agent provides relatively lower latency for communications than a wide area network connection to one or more other storage units of the plurality of storage units.

14. The non-transitory computer readable storage medium of claim 12, wherein the delegation agent includes an iterative storage unit access process associated with the storage unit.

15. The non-transitory computer readable storage medium of claim 11, wherein the one or more processing modules further cause the computing device to determine to delegate the multiple access steps to a delegation agent by:
   determining that the delegation agent can execute the at least a portion of the multiple access steps better than the one or more processing modules.

16. The non-transitory computer readable storage medium of claim 11, wherein the storage unit includes a storage unit processor, wherein the delegation agent comprises one or more storage unit processing modules of the storage unit processor.

17. The non-transitory computer readable storage medium of claim 11, wherein the storage network access request comprises:
   a request for addressing information regarding data having one or more search criteria, wherein an iterative storage unit access process is executed to traverse an index tree to identify the data based on the one or more search criteria; and
   a request for the data having the one or more search criteria.

18. The non-transitory computer readable storage medium of claim 11, wherein a decode threshold number of a set of storage units is required to execute the storage network access request, wherein at least a decode threshold number of storage units is coupled via a wide area network connection to the storage unit.

19. The non-transitory computer readable storage medium of claim 11, wherein the one or more processing modules further cause the computing device to determine to delegate at least as portion of the multiple access steps to a delegation agent by:
   determining that the delegation agent can execute at least a portion of the multiple access steps better than the computing device when the delegation agent is coupled to a minimum number of storage units of the plurality of storage units via a local area network connection.

20. The non-transitory computer readable storage medium of claim 11 wherein the one or more processing modules further cause the computing device to:
   for each step of the multiple access steps:
      receive a group partial response from the delegation agent that represents a collective response of a first sub-set of the plurality of storage units;
      receive iterative partial responses from a second sub-set of the plurality of storage units; and
      process a group partial response and the iterative partial responses to produce an iterative response.

* * * * *